US011328047B2

(12) United States Patent
Larson et al.

(10) Patent No.: US 11,328,047 B2
(45) Date of Patent: May 10, 2022

(54) GAMIFIED CHALLENGE TO DETECT A NON-HUMAN USER

(71) Applicant: MICROSOFT TECHNOLOGY LICENSING, LLC., Redmond, WA (US)

(72) Inventors: Timothy Colin Larson, Austin, TX (US); Daniel. E. Castro, Kirkland, WA (US); Andrew Ryan Pickering, Woodinville, WA (US); Jiong Wang, Seattle, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 251 days.

(21) Appl. No.: 16/669,912

(22) Filed: Oct. 31, 2019

(65) Prior Publication Data

US 2021/0133304 A1    May 6, 2021

(51) Int. Cl.
*G06F 21/36* (2013.01)
*G06F 21/45* (2013.01)
*H04L 67/02* (2022.01)
*H04L 29/06* (2006.01)

(52) U.S. Cl.
CPC .............. *G06F 21/36* (2013.01); *G06F 21/45* (2013.01); *H04L 63/08* (2013.01); *H04L 67/02* (2013.01); *G06F 2221/2133* (2013.01)

(58) Field of Classification Search
CPC .. G06F 21/36; G06F 21/45; G06F 2221/2133; H04L 63/08; H04L 67/02
See application file for complete search history.

(56) References Cited

U.S. PATENT DOCUMENTS

| | | | | |
|---|---|---|---|---|
| 5,921,548 | A  * | 7/1999 | Goldberg | A63F 9/34 273/157 R |
| 7,653,931 | B1 * | 1/2010 | Peterson | G06F 21/36 726/2 |
| 8,023,927 | B1 * | 9/2011 | Coleman | H04L 63/083 455/410 |
| 9,272,208 | B1 * | 3/2016 | LeTourneau | A63F 13/63 |
| 9,450,958 | B1 * | 9/2016 | Saylor | H04L 63/102 |
| 9,519,763 | B1 * | 12/2016 | Rodriguez | G06F 3/0488 |
| 9,767,263 | B1 * | 9/2017 | McInerny | G06F 21/31 |
| 10,007,776 | B1 * | 6/2018 | Bailey | G06T 11/001 |
| 10,225,252 | B1 | 3/2019 | Den Boer et al. | |

(Continued)

FOREIGN PATENT DOCUMENTS

EP      3382934 A1    10/2018
WO   2010111169 A1    9/2010

OTHER PUBLICATIONS

"International Search Report and Written Opinion Issued in PCT Application No. PCT/US20/056946", dated Feb. 8, 2021, 10 Pages.

*Primary Examiner* — Aravind K Moorthy

(57) ABSTRACT

A gamified challenge is presented to a user communicating with a website when the user is suspected of being a bot. The gamified challenge consists of a dynamic sequence of animated geometric objects displayed in an order that the user has to interact with within an allotted amount of time. The complexity of the gamified challenge increases when the challenge is failed and when features extracted from the user session indicate a high level of suspicion that the gamified challenge is performed by a non-human user.

20 Claims, 11 Drawing Sheets

(56) References Cited

U.S. PATENT DOCUMENTS

| | | | | |
|---|---|---|---|---|
| 10,482,462 | B1* | 11/2019 | Eidam | G06Q 20/1085 |
| 10,540,492 | B1* | 1/2020 | Norris, III | G06F 21/36 |
| 10,839,066 | B1* | 11/2020 | Pham | G06F 21/40 |
| 2004/0172564 | A1* | 9/2004 | Federova | G06F 21/36 |
| | | | | 726/7 |
| 2005/0097320 | A1* | 5/2005 | Golan | G06F 21/40 |
| | | | | 713/166 |
| 2008/0216163 | A1* | 9/2008 | Pratte | G06F 21/316 |
| | | | | 726/7 |
| 2009/0150983 | A1* | 6/2009 | Saxena | G06F 21/36 |
| | | | | 726/7 |
| 2009/0150986 | A1* | 6/2009 | Foreman | G06F 21/36 |
| | | | | 726/9 |
| 2009/0187481 | A1* | 7/2009 | Bonzi | H04W 4/20 |
| | | | | 705/14.66 |
| 2010/0028846 | A1* | 2/2010 | Cohen | G09B 15/00 |
| | | | | 434/323 |
| 2010/0251388 | A1* | 9/2010 | Dorfman | G06F 21/36 |
| | | | | 726/29 |
| 2011/0150267 | A1* | 6/2011 | Snelling | G06Q 30/02 |
| | | | | 382/100 |
| 2011/0264663 | A1* | 10/2011 | Verkasalo | G06Q 10/0637 |
| | | | | 707/740 |
| 2011/0282997 | A1* | 11/2011 | Prince | H04L 63/1433 |
| | | | | 709/226 |
| 2011/0314540 | A1* | 12/2011 | Poluri | G06F 21/31 |
| | | | | 726/21 |
| 2012/0084450 | A1* | 4/2012 | Nagamati | G06F 21/31 |
| | | | | 709/229 |
| 2012/0117239 | A1* | 5/2012 | Holloway | H04L 63/0884 |
| | | | | 709/226 |
| 2012/0166409 | A1* | 6/2012 | Saxena | G06F 21/31 |
| | | | | 707/705 |
| 2012/0243729 | A1* | 9/2012 | Pasquero | G06F 3/013 |
| | | | | 382/103 |
| 2012/0246737 | A1* | 9/2012 | Paxton | G06F 16/24578 |
| | | | | 726/27 |
| 2012/0323700 | A1* | 12/2012 | Aleksandrovich | G06Q 30/00 |
| | | | | 705/14.69 |
| 2013/0097697 | A1* | 4/2013 | Zhu | G06F 21/31 |
| | | | | 726/18 |
| 2013/0322616 | A1* | 12/2013 | Bayer, Sr | G06F 21/6209 |
| | | | | 380/28 |
| 2014/0059663 | A1* | 2/2014 | Rajshekar | G06F 21/31 |
| | | | | 726/6 |
| 2014/0066176 | A1* | 3/2014 | LeTourneau | A63F 13/335 |
| | | | | 463/23 |
| 2014/0067474 | A1* | 3/2014 | Deo | G06Q 30/0203 |
| | | | | 705/7.32 |
| 2014/0181968 | A1* | 6/2014 | Ge | H04L 63/1425 |
| | | | | 726/23 |
| 2014/0189798 | A1* | 7/2014 | Grimaud | G06F 21/36 |
| | | | | 726/4 |
| 2014/0189835 | A1* | 7/2014 | Umerley | G06F 21/40 |
| | | | | 726/7 |
| 2014/0208419 | A1* | 7/2014 | Chang | G06F 21/31 |
| | | | | 726/21 |
| 2014/0289833 | A1* | 9/2014 | Briceno | H04L 9/006 |
| | | | | 726/7 |
| 2014/0317723 | A1* | 10/2014 | Hicks | G06F 21/36 |
| | | | | 726/19 |
| 2014/0330900 | A1* | 11/2014 | Libin | H04L 67/02 |
| | | | | 709/204 |
| 2015/0190709 | A1* | 7/2015 | Moorthy | G09B 19/00 |
| | | | | 463/9 |
| 2015/0235018 | A1* | 8/2015 | Gupta | G06F 21/36 |
| | | | | 726/19 |
| 2015/0314440 | A1* | 11/2015 | Parker | B25J 9/1689 |
| | | | | 700/253 |
| 2015/0317700 | A1* | 11/2015 | Ford | G06Q 30/0277 |
| | | | | 705/71 |
| 2016/0028730 | A1* | 1/2016 | Natarajan | A63F 13/537 |
| | | | | 726/6 |
| 2016/0065559 | A1* | 3/2016 | Archer | H04L 63/083 |
| | | | | 726/8 |
| 2016/0125193 | A1* | 5/2016 | Dai Zovi | G06F 21/36 |
| | | | | 726/28 |
| 2016/0234191 | A1* | 8/2016 | Leong | G09C 5/00 |
| 2016/0239656 | A1* | 8/2016 | Yan | G06T 1/00 |
| 2016/0300054 | A1* | 10/2016 | Turgeman | G06F 21/36 |
| 2017/0013012 | A1* | 1/2017 | Hansen | G06F 21/31 |
| 2017/0032113 | A1* | 2/2017 | Tunnell | H04L 9/3226 |
| 2017/0060857 | A1* | 3/2017 | Imbruce | H04L 67/02 |
| 2017/0063932 | A1* | 3/2017 | Hubbard | H04L 63/0861 |
| 2017/0109752 | A1* | 4/2017 | Hubbard | G06Q 20/34 |
| 2017/0161490 | A1* | 6/2017 | Fedor | G06F 21/31 |
| 2017/0180348 | A1* | 6/2017 | Piccolotto | G06K 9/00355 |
| 2017/0237766 | A1* | 8/2017 | Mattson | G06F 21/60 |
| | | | | 726/23 |
| 2017/0262623 | A1* | 9/2017 | Plenderleith | G06F 21/36 |
| 2017/0318019 | A1* | 11/2017 | Gordon | H04L 9/3226 |
| 2018/0060550 | A1* | 3/2018 | Li | G06F 21/30 |
| 2018/0089453 | A1* | 3/2018 | Scholz | G06F 21/6218 |
| 2018/0115597 | A1* | 4/2018 | Gillette | H04L 67/18 |
| 2018/0158053 | A1* | 6/2018 | Adams | G06F 3/011 |
| 2018/0197575 | A1* | 7/2018 | Doherty | G06F 40/106 |
| 2018/0310171 | A1* | 10/2018 | Whitaker | H04W 12/08 |
| 2018/0322270 | A1* | 11/2018 | Bailey | H04L 63/083 |
| 2018/0349206 | A1* | 12/2018 | Erickson | G06F 40/263 |
| 2019/0015747 | A1* | 1/2019 | Thompson | H04N 13/351 |
| 2019/0026448 | A1* | 1/2019 | Bhamidipaty | G06F 21/6218 |
| 2019/0043241 | A1* | 2/2019 | Scheff | H04L 67/10 |
| 2019/0220588 | A1* | 7/2019 | Agarwal | G06F 3/04886 |
| 2019/0236262 | A1* | 8/2019 | Yamada | G06F 21/36 |
| 2019/0244196 | A1* | 8/2019 | John | G06Q 20/24 |
| 2019/0347399 | A1* | 11/2019 | Cramer | G06F 21/36 |
| 2019/0377861 | A1* | 12/2019 | Whitney | G06F 21/36 |
| 2019/0387005 | A1* | 12/2019 | Zawoad | H04L 63/1425 |
| 2020/0012780 | A1* | 1/2020 | Seshadri | H04L 63/08 |
| 2020/0028874 | A1* | 1/2020 | Lam | H04L 63/1425 |
| 2020/0042681 | A1* | 2/2020 | Benkreira | A61B 5/08 |
| 2020/0074059 | A1* | 3/2020 | Beckett, Jr. | G06F 21/32 |
| 2020/0076715 | A1* | 3/2020 | Kondapalli | H04L 43/08 |
| 2020/0089867 | A1* | 3/2020 | Kim | H04L 9/3231 |
| 2020/0097643 | A1* | 3/2020 | Uzun | G06K 9/00899 |
| 2020/0134159 | A1* | 4/2020 | Ford | G06F 21/46 |
| 2020/0193009 | A1* | 6/2020 | Shafet | G06F 16/3347 |
| 2020/0204541 | A1* | 6/2020 | Nair | G01S 13/34 |
| 2020/0204845 | A1* | 6/2020 | Laurent | H04N 21/482 |
| 2020/0234310 | A1* | 7/2020 | Daley | G06Q 30/0185 |
| 2020/0280544 | A1* | 9/2020 | Sivaraman | H04L 63/06 |
| 2020/0288306 | A1* | 9/2020 | Do | H04L 63/1433 |
| 2021/0109895 | A1* | 4/2021 | Umashankar | G06F 16/183 |

\* cited by examiner

GAMIFIED CHALLENGE TO DETECT A NON-HUMAN USER

BACKGROUND

Automated software programs, referred to as bots, web bots, or robots, typically run automated scripts to perform simple tasks at a faster rate than a human. There are various types of bots. The most popular bots are web spiders or crawlers that are used by search engines to search the content of a website to generate indices of the website's content for a search engine. A chat bot engages in conversations with humans or other bots. A shopbot searches the Internet for the best price for a commodity.

However, bots have been employed for malicious purposes. Bots have been used to sign up for free email accounts every minute in order to send thousands of junk emails. Bots have been used to participate in online chatrooms in order to direct the chatroom's participants to advertisements. Bots have been used to participate in online polls in order to influence the outcome of the poll in a desired manner. Bots have also been used to impersonate humans to target and persuade humans to give away or provide sensitive information.

To combat bots, programs are used that facilitate tests that are capable of only being passed by a human user in order to detect a bot. However, some of these tests are cumbersome and time-consuming for a human. Others may be dependent on the user's language, physical location and education and not universally applicable for wide spread use.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A user interface uses a gamified challenge to determine whether the input detected through the user interface is from a human or a non-human user. In one aspect, the gamified challenge is a dynamic geometric-series based challenge that displays a random, variable-length sequence of different types of geometric objects. The objects in the sequence are animated, colored, and/or oriented at a particular angle. The user has to play the gamified challenge by repeating the order in which the objects are animated in the user interface or by engaging with the geometric-series based challenge as dynamically instructed by the challenge. For example, the instructions may dictate that the user click only on the red objects or blue squares that are pulsated. The challenge is dynamically-constructed in order to ensure that a bot does not detect patterns in the challenge.

The gamified challenge is utilized when the user interface suspects that input may be generated from a non-human user. This suspicion is based on a risk level that considers several features extracted from the user session and from usage metrics of the website. A risk engine associated with the website monitors the behavior of the user session communications and usage metrics in order to generate a risk level based on that behavior.

The gamified challenge becomes progressively harder when a challenge is failed or when the tracked features suggest that the challenge is actively being tampered with. The number of objects in the sequence may be increased, a different type of animation may be used, additional geometric objects may be used and/or the orientation of the objects may change. The user is given a predetermined amount of time to pass the challenge and/or a pre-configured amount of attempts. When the user fails the challenge due to a set number of attempts or failure within the allotted time frame, the user is denied any further interactions with the website and suspected of being a non-human user.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

The aspects disclosed pertain to various mechanisms for detecting a non-human user interacting with a website. A user interface of the website uses a gamified challenge to determine whether the input detected through the user interface is from a human or a non-human user or bot. In one aspect, the gamified challenge is a dynamic geometric-series based challenge that displays a random, variable-length, sequence of different types of geometric objects. The objects in the sequence are animated, colored, and/or oriented at a particular angle. The user has to play the gamified challenge in order to obtain access to a resource or service from the website, such as obtaining a new user account, or the like.

The gamified challenge is utilized when the user interface suspects that input may be generated from a non-human user. This suspicion is based on a risk level that considers factors associated with the user. A risk engine monitors the behavior of the user accessing resources/services of the website and the usage of the website in general in order to determine if a non-human user is interacting with the user interface.

The gamified challenge becomes progressively harder when a challenge is failed. The number of objects in the sequence may be increased, a different type of animation may be used, additional geometric objects may be used and/or the orientation of the objects may change. The user is given a predetermined amount of time to pass the challenge and/or a pre-configured amount of attempts. When the user fails the challenge after a threshold number of attempts within the allotted time frame, the user is denied any further interactions with the website and suspected of being a non-human user.

The gamified challenge applies gaming elements to the challenge to make the challenge more engaging and attractive to a human. The geometric objects are universally-known shapes and are not constrained to a particular language or geographic location. The gaming elements make the challenge entertaining and an enjoyable experience. The animation of the gaming elements in a sequence can be easily comprehended by a human user but challenging for a bot.

The gamified challenge includes instructions that inform the user on what to do with the displayed geometric objects. For example, the gamified challenge may instruct a user to click on red or blue objects that are pulsated or click on a sequence of objects in a particular order.

Gamified differs from playing games online. Gamified pertains to using game design elements to situations that are not designed to be games. For example, in one aspect, the gamified challenge is utilized in servicing new account requests. The gamified challenge is given to an anonymous user in order to ensure that the user is a human rather than a bot.

Attention now turns to a further discussion of the system, devices, components, and methods utilized in a code completion system.

System

Figure 1:
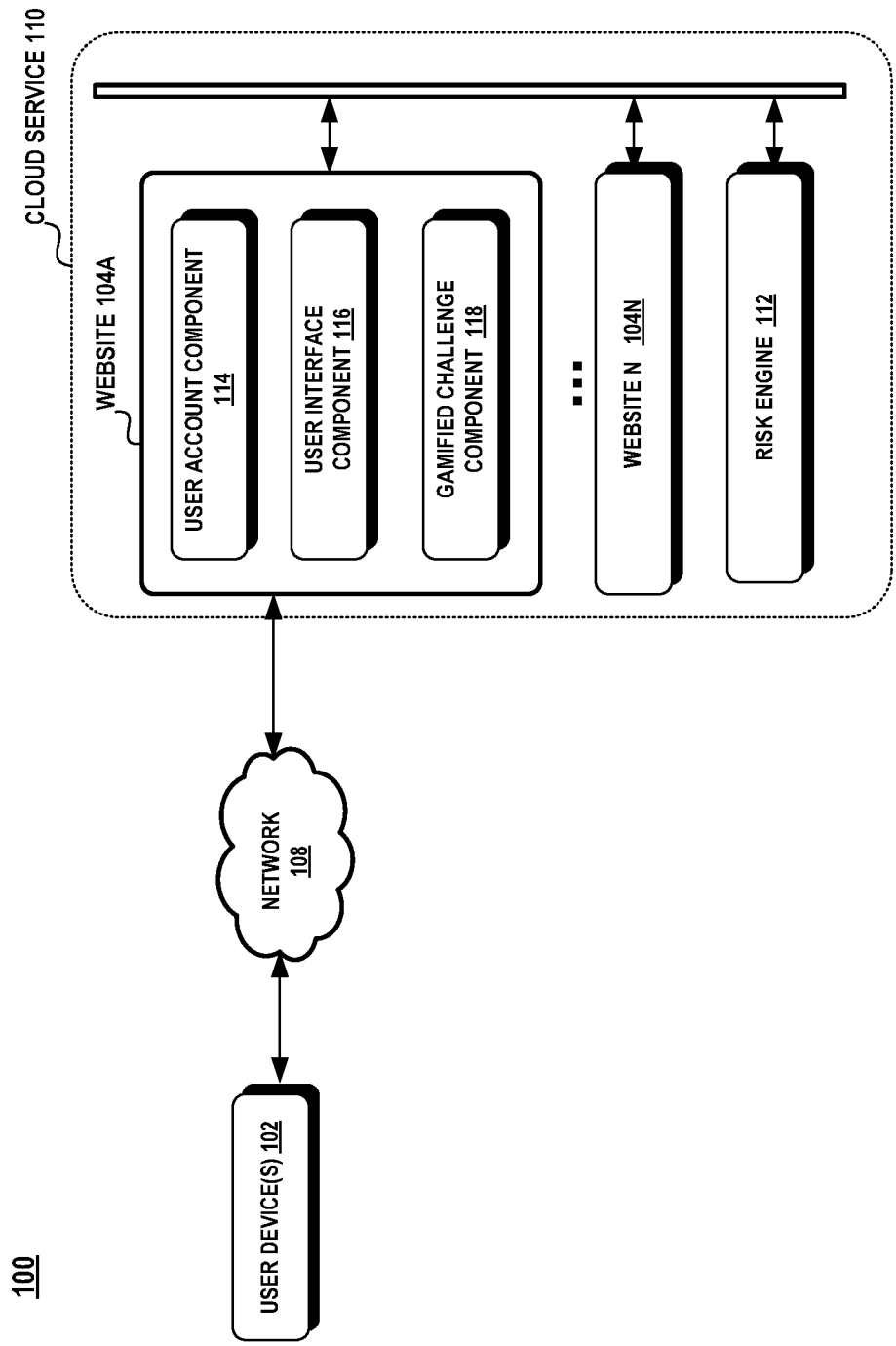
FIG. 1 illustrates an exemplary system for utilizing a gamified challenge to detect a non-human user.

FIG. 1 illustrates a block diagram of an exemplary system 100 in which various aspects of the invention may be practiced. As shown in FIG. 1, the system 100 includes one or more users communicatively coupled to an electronic device (i.e., user device) 102 and one or more websites 104A-104N, all communicatively coupled to a global computer network 108, such as the Internet. In one aspect, the websites 104A-104N may be part of a cloud service 110. The cloud service 110 may contain a risk engine 112 that tracks the activities performed within a user session and within the website to generate a risk level based on the tracked activities.

At least one website 104A utilizes the gamified challenge during a new user account registration process. The website 104A offers resource and/or services to registered users through the Internet which requires a user to have an account with the website. The resources and/or services may include an online software subscription service (e.g., Office365, etc.), a webmail service (e.g., Gmail, outlook, yahoo mail), and the like.

The website 104A includes a user account component 114, a user interface component 116, and a gamified challenge component 118. The user account component 114 maintains a repository of the registered user accounts. The user interface component 116 interacts with the user through visual displays to obtain input data and to display output data. The user interface component 116 may be part of an operating system. The user interface component 116 may generate web pages that are provided to the browser of the user device 102 to facilitate communications between the user device 102 and the website 104A.

The gamified challenge component 118 interacts with the user to facilitate the challenges. The gamified challenge component 118 provides one or more dynamic challenges to the user, obtains the responses from the user, and analyzes the responses. The gamified challenge component 118 may be part of the user interface component.

The risk engine 112 monitors the activities that are performed in a user session and the activities performed at all the websites of the cloud service. The monitored activities are then characterized by several factors, such as the number of times the user fails a challenge, the number of times the user exceeds an expected time to complete a challenge, the location of the client device engaged in the user session, the reputation of the IP address used to communicate with the website, the browser and browser extension used, and the time-of-day the communication is initiated. The reputation of the IP address is based on the frequency of accesses to the cloud service from an IP address, the amount of spam generated from the IP address, the number of DOS attacks attributable to the IP address, and the like.

The user account component 114, the user interface component 116, the gamified challenge component 118, and the risk engine 112 may be a sequence of computer program instructions, that when executed by a processor, causes the processor to perform methods and/or operations in accordance with a prescribed task. These components may be implemented as program code, programs, procedures, module, code segments, program stacks, middleware, firmware, methods, routines, and so on. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

It should be noted that FIG. 1 shows components of the system in one aspect of an environment in which various aspects of the invention may be practiced. However, the exact configuration of the components shown in FIG. 1 may not be required to practice the various aspects and variations in the configuration shown in FIG. 1 and the type of components may be made without departing from the spirit or scope of the invention. For instance, although FIG. 1 is directed to the creation of a new user accounts, the components shown in FIG. 1 can be applied to other scenarios that involve access to resources offered by a network-based computing device, such as user logon access, access to web forms, etc. Alternatively, the risk engine 112 may configured outside of the cloud service 110 and in other aspects, the risk engine 112 may be part of each website.

Figure 2:
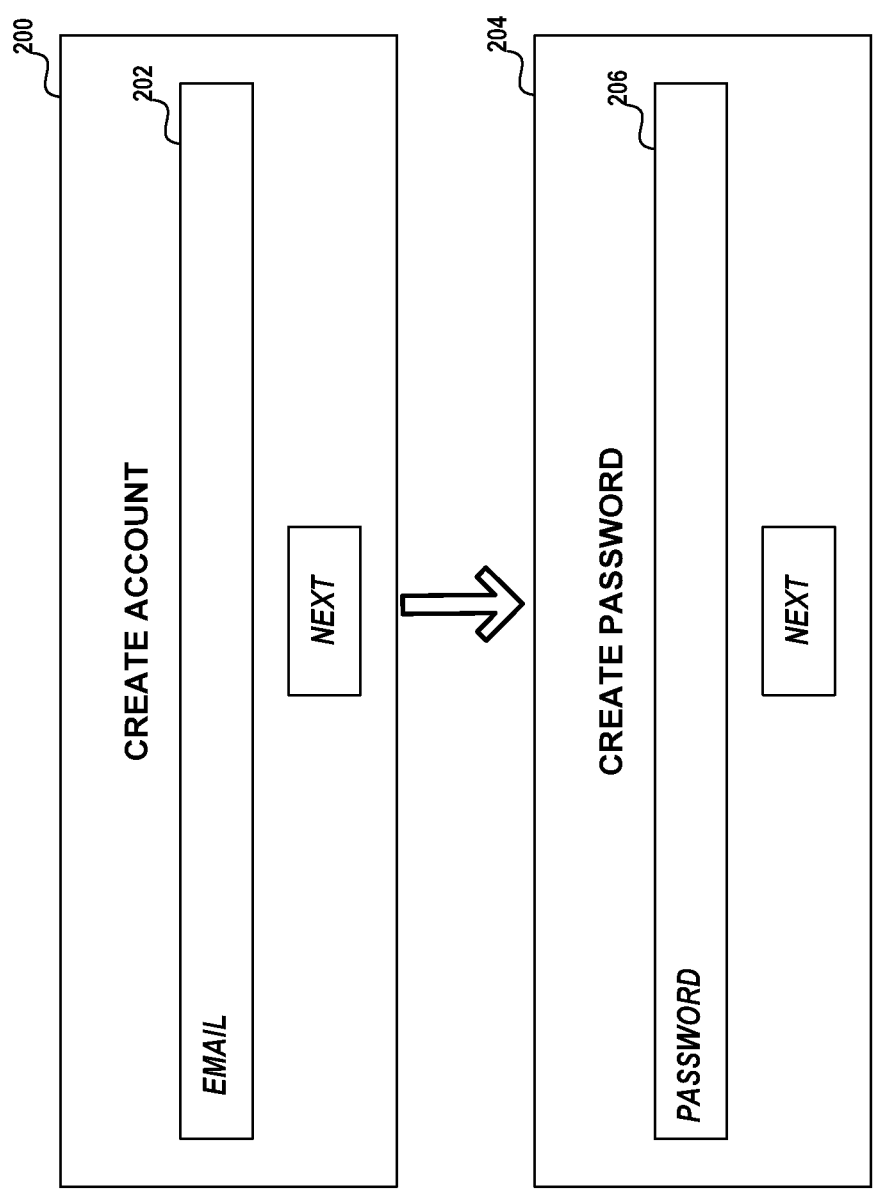
FIG. 2 is an exemplary user interface display illustrating the creation of a new user account.

Attention now turns to an exemplary illustration of the gamified challenge. In one aspect, the gamified challenge is used in the registration of a new user's account with a website. Referring to FIGS. 1 and 2, a request is received by the user interface component 116 to create a new user account for the website. In response to the request, the user interface component 116 generates a display 200 to obtain a unique personal identifier 202 from the user, such the user's email address or phone number, that will serve as the account identifier for the user. Once the unique personal identifier is input 202, then another display 204 is generated for the user to create a password for the account 206.

The user interface component 116 issues a request to the risk engine 112 to determine if there is a risk associated with the new account request. For example, the IP address associated with the request may have been previously associated with numerous failed logon attempts and, in this case, the gamified challenge component 118 presents a first-level gamified challenge to the user.

Figure 3A:
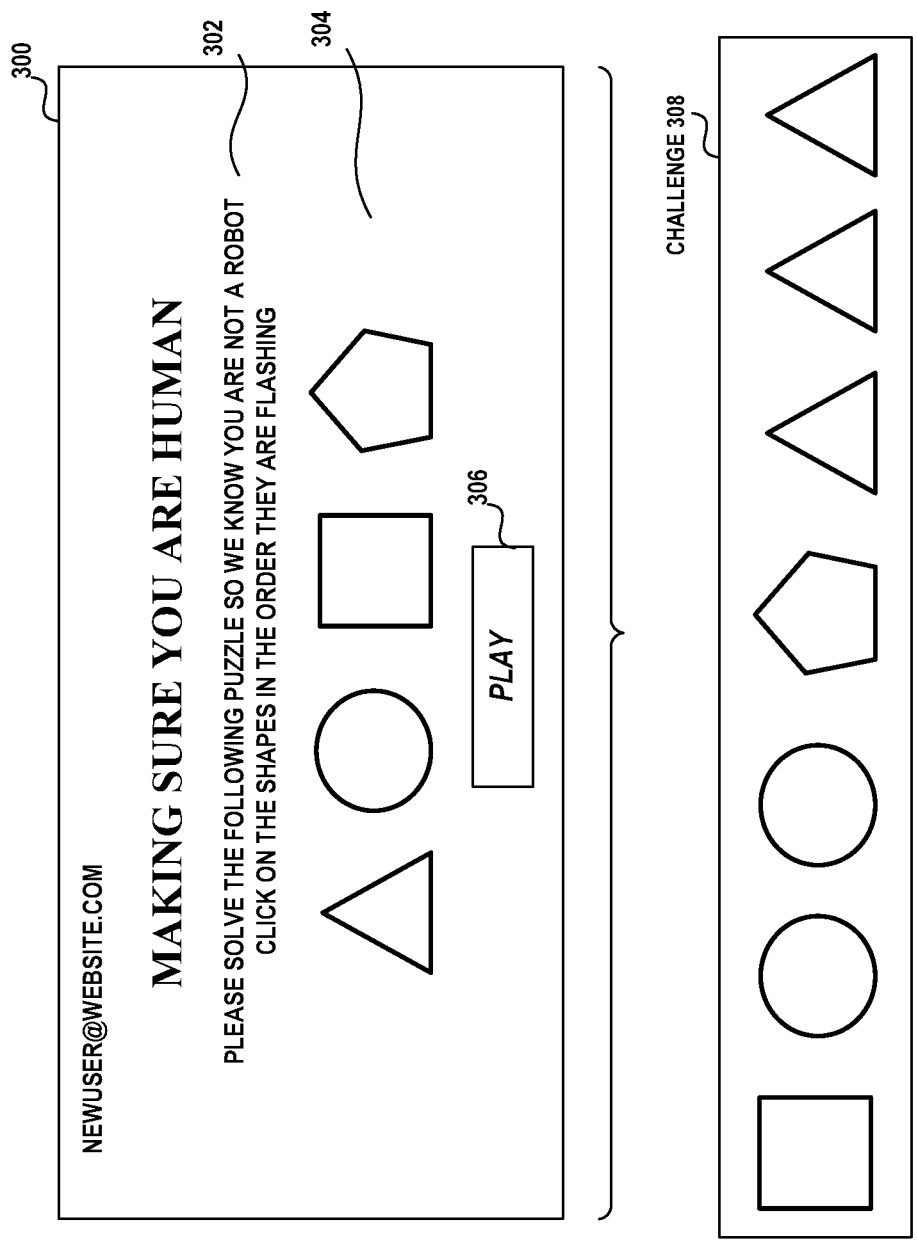
FIGS. 3A-3G are exemplary user interface displays illustrating various stages of the gamified challenge.

FIG. 3A illustrates an exemplary first-level gamified challenge. As shown in FIG. 3A, a user display 300 may present a dynamically-generated variable-length sequence of random geometric shapes 304 where each geometric shape is animated. In this particular challenge, the geometric shapes are flashing. However, other animation techniques may be used as well such as bouncing up and down, rotational movement, checkboard transition effect, ripple effect, lighting effect, horizontal image transition effect, striped transition effect or showing movement in some manner.

In addition, the geometric shapes may be displayed in different colors and in a particular orientation. There are instructions 302 on the user display that explain the gamified challenge. For example, a gamified challenge 308 appears which presents a sequence of animated geometric objects in a particular order. The user has to hit the play icon 306 and repeat the sequence by touching/clicking each of the geometric shapes in the same order that the shapes are displayed in the challenge 308.

As shown in FIG. 3A, the challenge sequence 308 consists of the following geometric objects in the following order: square; circle; circle; hexagon; triangle; triangle; and triangle. The challenge 308 is displayed in the user interface by animating each of the objects shown in the display 300 in a particular order. Once the user recognizes the order, the user presses the play icon 306 and touches each of the geometric shapes in the same order that the shapes were displayed in the challenge 308.

Figure 3B:
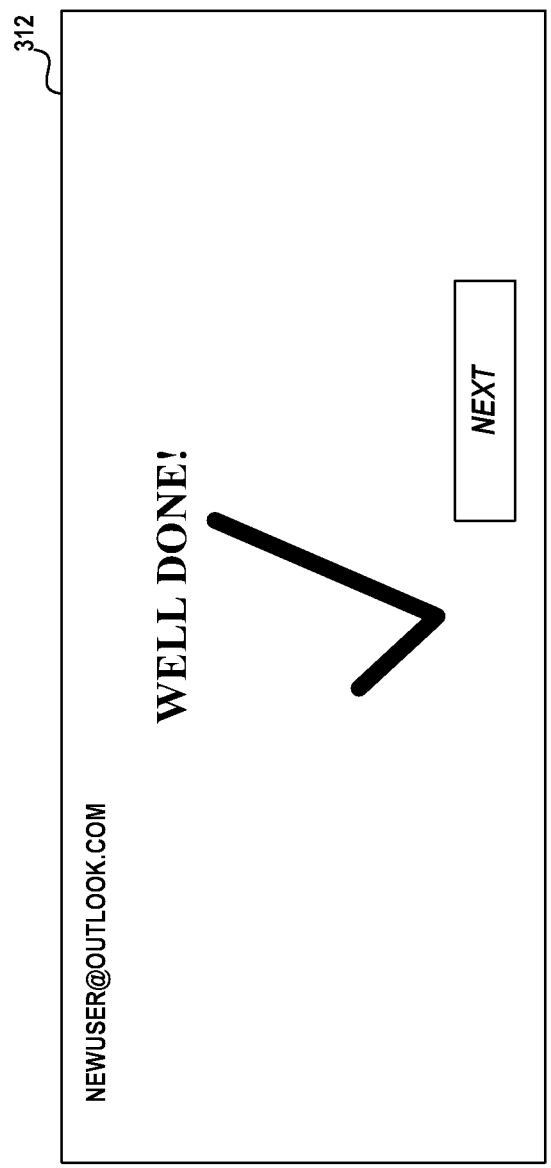
Figure 3C:
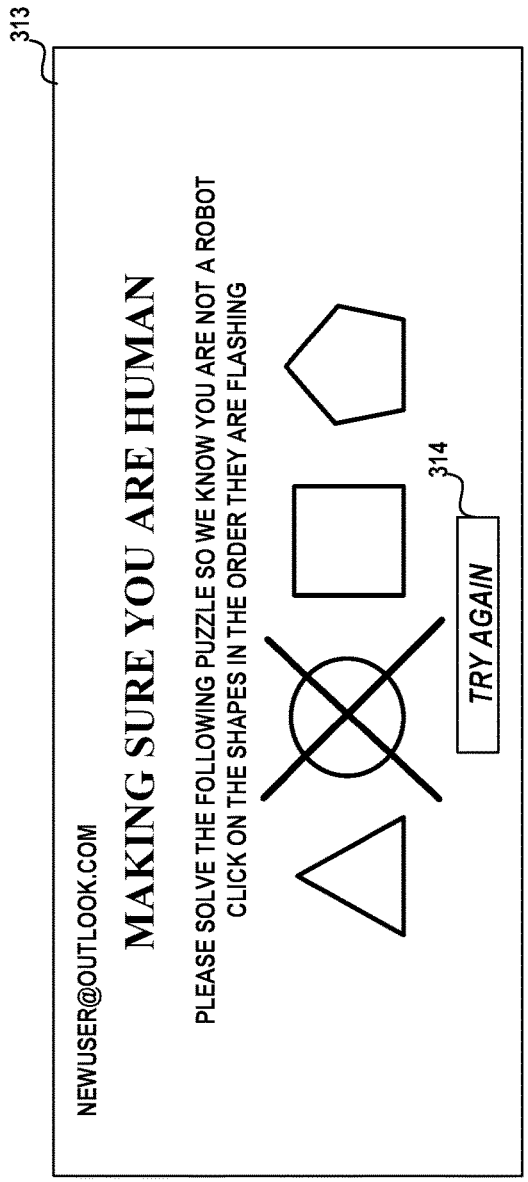

The gamified challenge component 118 tracks the sequence input by the user. If the sequence is correct, an acceptance display 312 is generated, as shown in FIG. 3B, which indicates that the challenge has been passed. Referring to FIG. 3C, if the user inputs a geometric object in the wrong order, the gamified challenge component 118 displays an error indicator over the incorrect input 313. As shown in FIG. 3C, the circle was input out-of-order and as such, a large X character is displayed over the circle and the user may try again 314.

Figure 3D:
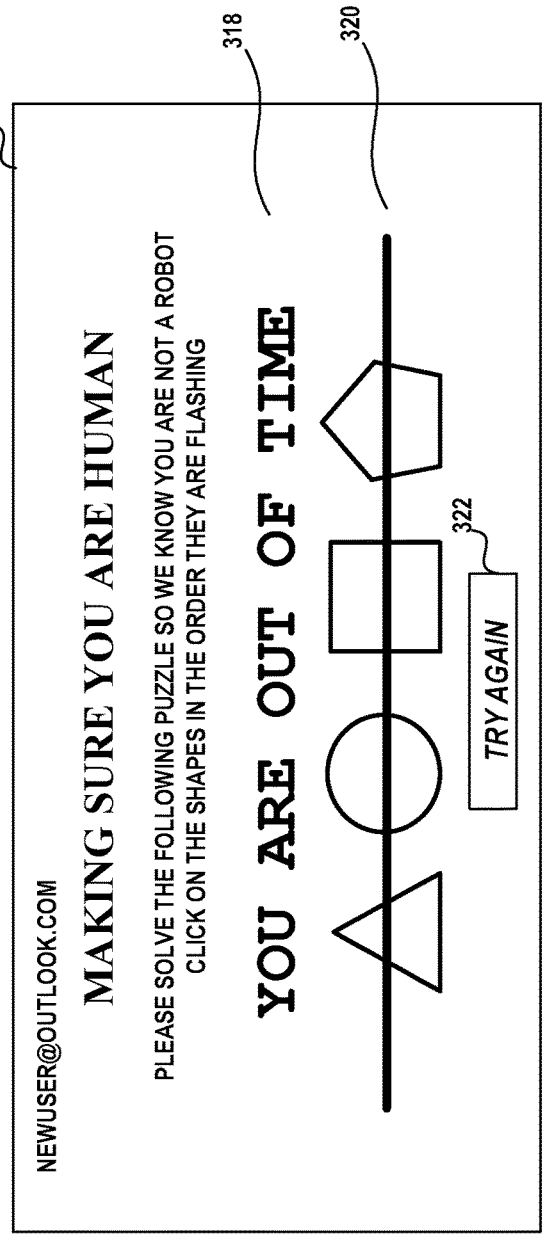

Alternatively, a user may be given a preconfigured amount of time to complete the gamified challenge. The time limit applied to the gamified challenge is based on the amount of time that a human user would normally take to complete the challenge. If the user does not complete the challenge within the prescribed time allotment, the gamified challenge component generates another error display 316, 320 as shown in FIG. 3D, indicating that the time limit was exceeded 318. The user may try again 322. At this point, the user is given a challenge with an increased level of complexity.

Figure 3E:
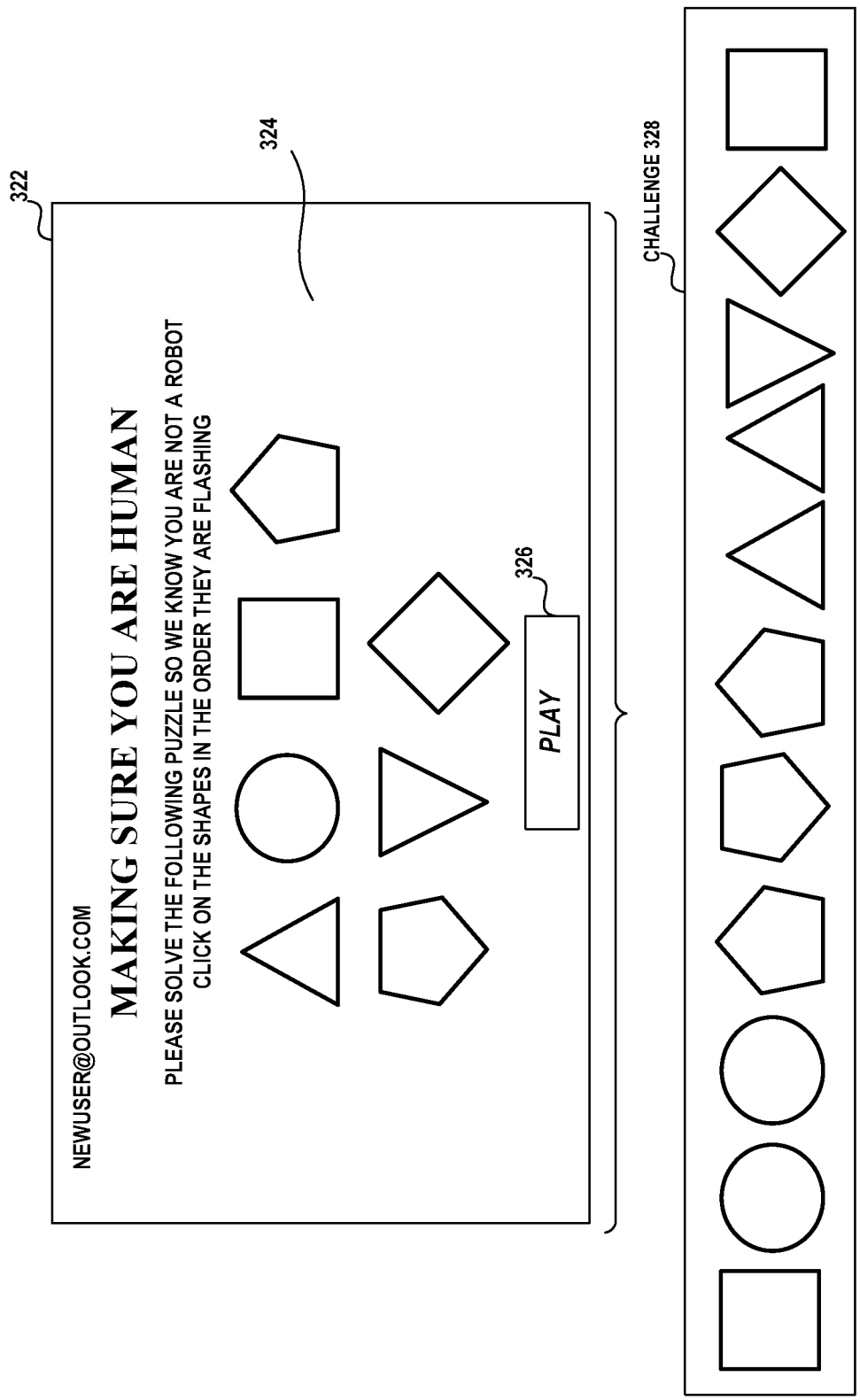

The increased level of complexity may include additional geometric objects, a different animation, and a longer challenge sequence as shown in FIG. 3E. Turning to FIG. 3E, in this display 322, the sequence 324 includes seven geometric objects: a triangle; a circle; a square; a hexagon; a hexagon rotated 180 degrees; a triangle rotated 180 degrees; and a diamond. The challenge sequence 328 includes these objects in the following order: square; circle; circle; hexagon; hexagon rotated 180 degrees; hexagon; triangle; triangle; triangle rotated 180 degrees; diamond; and square. The user is given another opportunity to initiate the play icon 326 to enter the challenge.

Figure 3F:
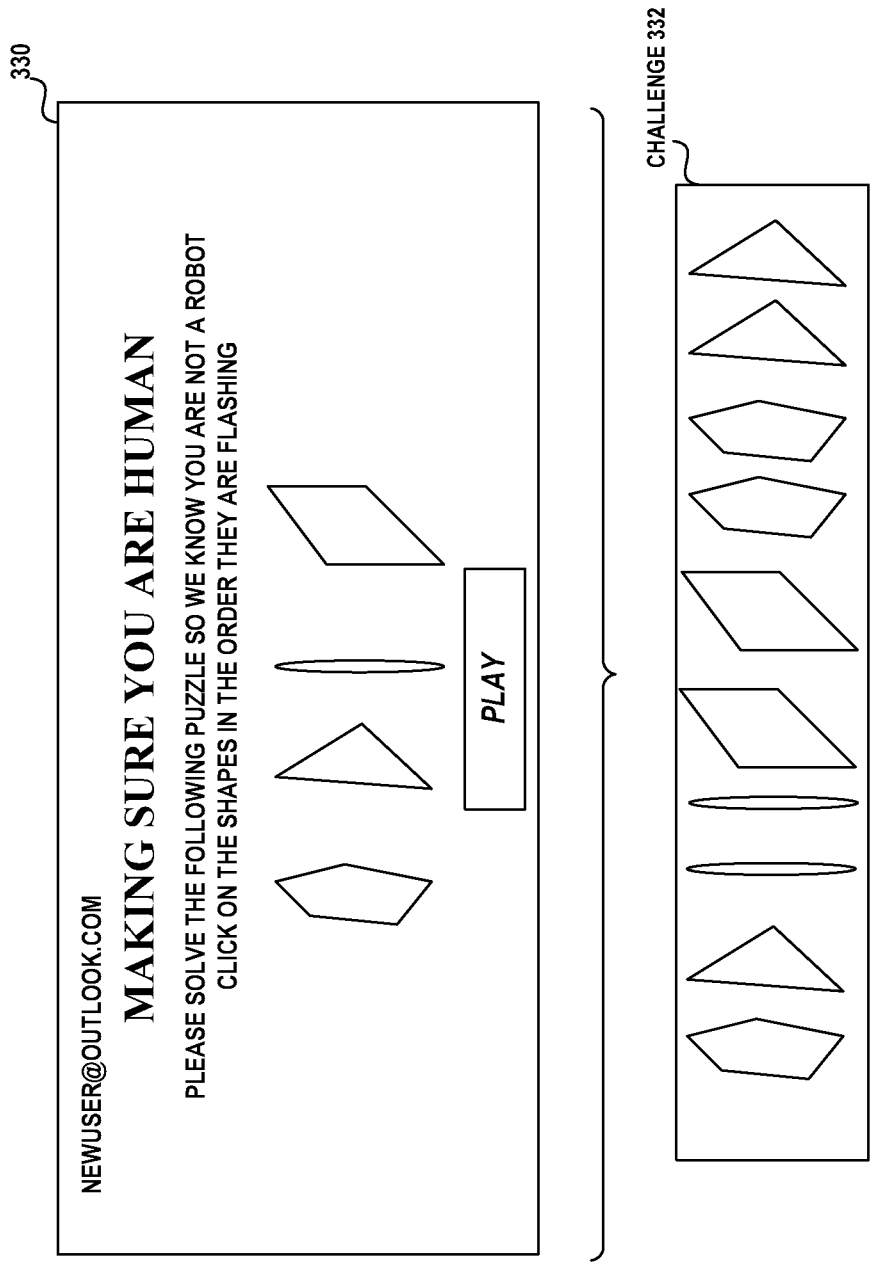

The increased level of complexity may also include a challenge that alters the orientation of the geometric objects. An orientation is the angular position of an object relative to the Cartesian coordinate system. Turning to FIG. 3F, there is shown a user display 330 with four shapes rotated at a forty-five-degree angle about the y-axis. The challenge 332 includes each of these rotated geometric objects in a particular sequence that is animated. The challenge is for the user to identify the order in which each of these rotated geometric objects is presented.

Figure 3G:
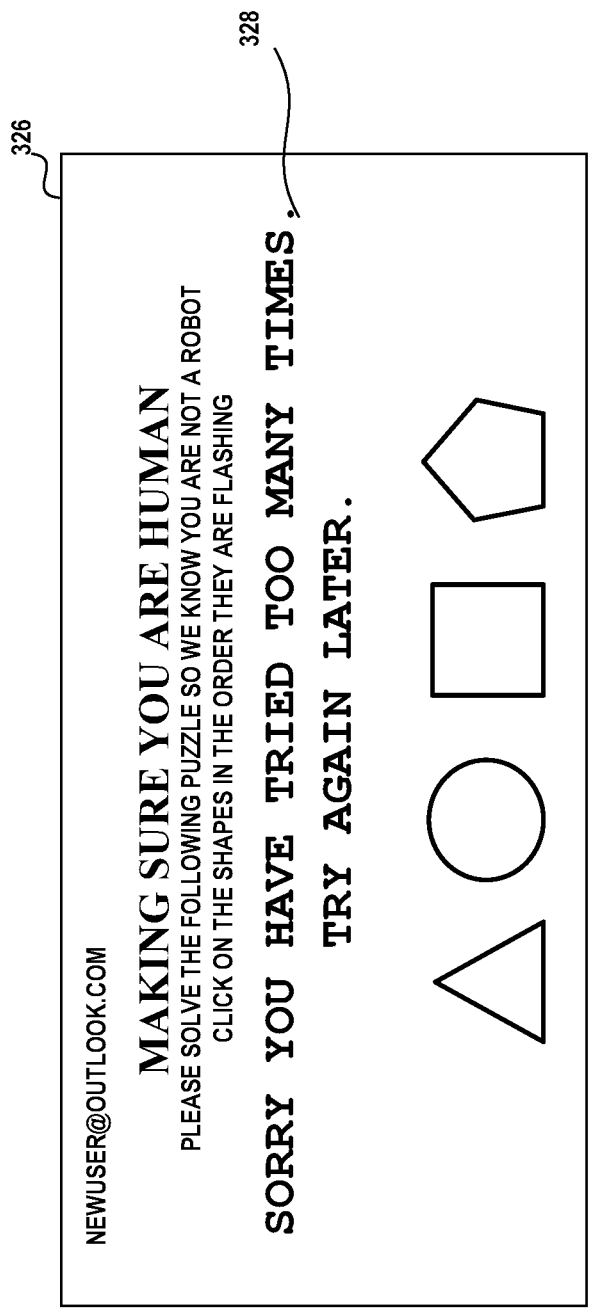

If the user passes a challenge, the acceptance display shown in FIG. 3B is displayed and the new user account is processed. If the user fails the geometric challenge repeatedly for more than a threshold number of attempts, the user's request is rejected as being performed by a non-human user. The user display 326 as shown in FIG. 3G may be presented to the user to inform them of their failed attempts. An error message is displayed 328 informing the user to try again later. However, the risk engine tracks this user session as suspicious having been possibly performed by a non-human user.

Methods.

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 4:
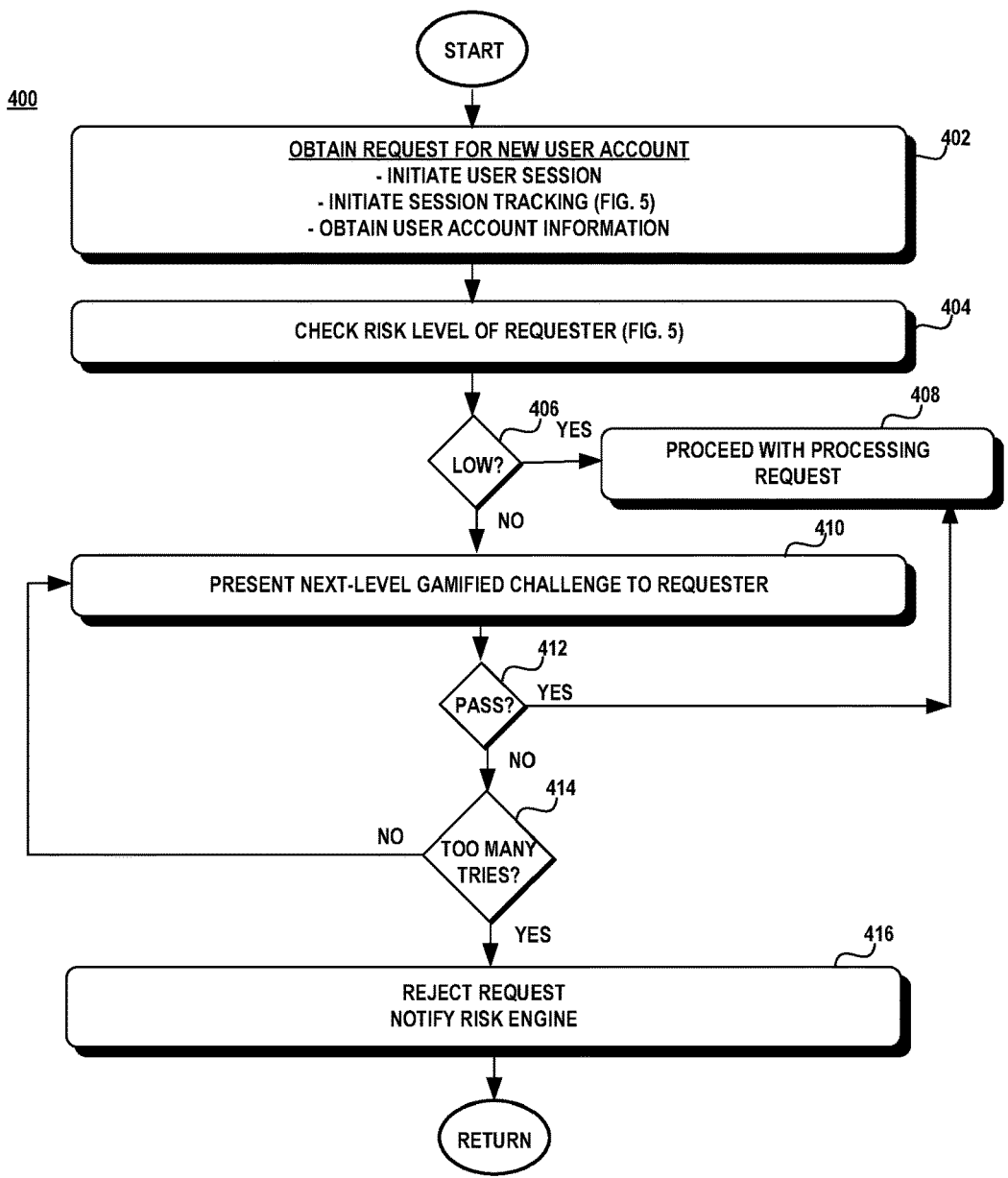
FIG. 4 is a flow diagram illustrating an exemplary method for utilizing the gamified challenge to detect a non-human user.

Turning to FIGS. 1 and 4, there is shown an exemplary method 400 of utilizing a gamified challenge. In one aspect, the gamified challenge is used to process a new user account request at a website. However, it should be understood that the same technique presented herein with respect to processing requests for a new user account may be used in other situations, such as other types of user registration or website access.

A website 104A receives a request to initiate a user session with a user device 102 (block 402).

Figure 5:
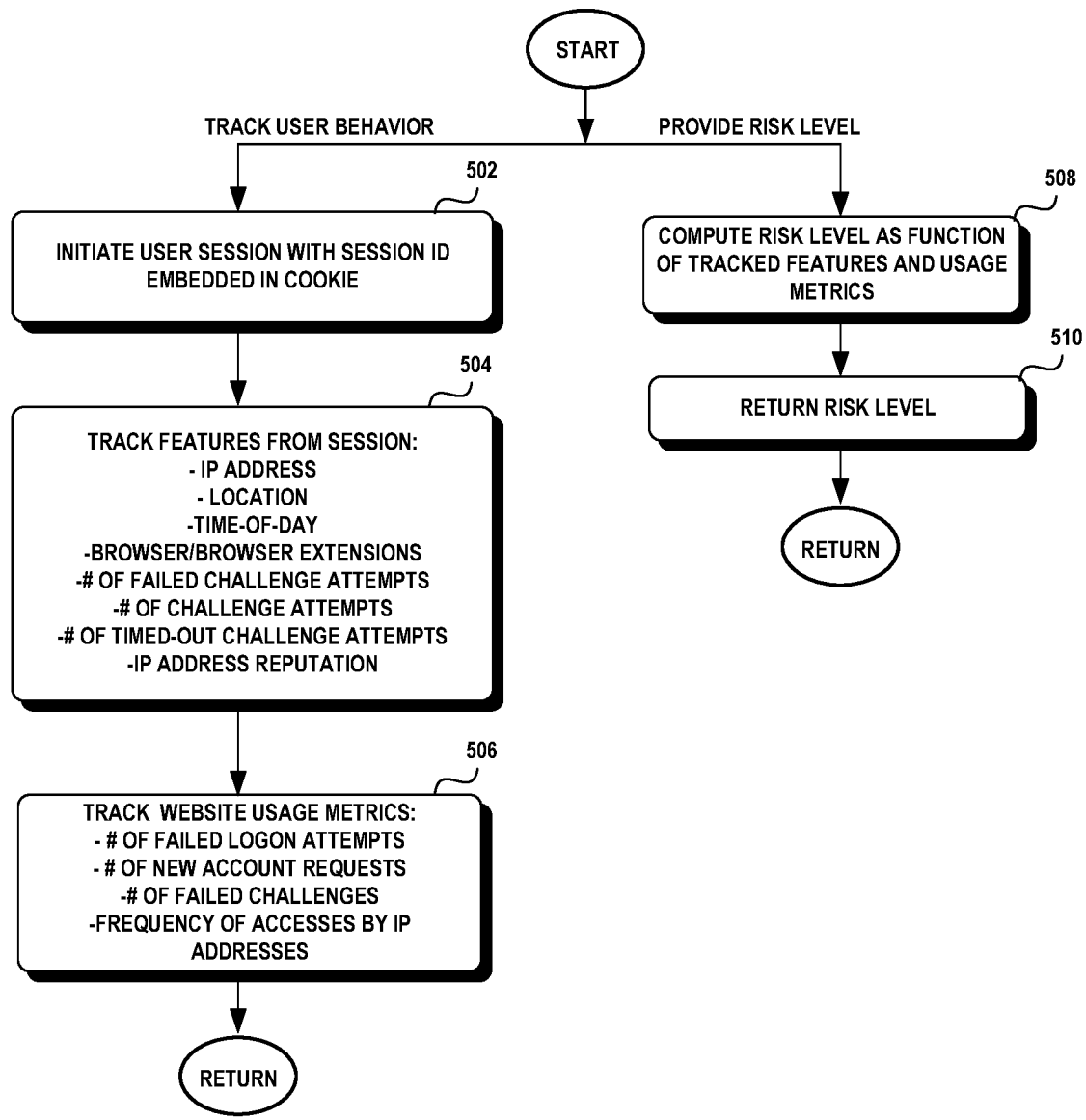
FIG. 5 is a flow diagram illustrating an exemplary method for tracking a user's behavior and tracking website usage metrics for determining a risk level.

Turning to FIG. 5, the user session is initiated by the web browser of the user's device 102 through an HTTP request to the website 104A. The website 104A generates a session identifier that is used for the duration of that user's session. The session identifier is a unique identifier and is stored as a cookie. Each time the user's browser interacts with the website, it passes the cookie to the website 104A. (Collectively, 502)

During the user session, the risk engine 112 tracks certain features from the information provided in each request and in the actions performed by the requester. These features may be recorded by session identifier and/or IP address. These features may include the IP address of the source of the request, the geographic location of the source of the request, the time-of-day the request was made, and the type of browser or browser extension used to make the request, and the IP address reputation. IP addresses associated with malicious activities, such as spam, denial-of-service attacks, fraudulent account creations, and the like may be tracked by third party services that are available to the risk engine 112. The risk engine uses the IP address to obtain the IP address reputation of the current user session. (Collectively, block 504).

The geographic location of the source of the request is considered since certain locations are more likely to be associated with malicious activities. The time-of-day a request is made is significant especially if requests are made consistently at the same time periodically over a time span. Typically, user-initiated requests are relatively random events with no clear pattern. Automatically-initiated requests tend to exhibit a periodic pattern that occur routinely over some time interval. The type of browser is significant since some browsers or browser extensions are known to have security exploits making them easily compromised. Additionally, the risk engine 112 tracks features performed by the user in the user session. For example, the risk engine 112 may track the number of challenges performed, the number of failed challenge attempts, and the number of timed-out challenge attempts (Collectively, block 504).

In addition, the risk engine 112 tracks usage metrics of the website and/or other websites in the cloud service. For example, the risk engine 112 may collect the number of new account requests and the number of failed logon attempts, number of failed challenges, and frequency of access by each IP address to the website. These usage metrics are used to gain insight into the current processing load of the website. The repeated failed logon attempts or repeated new account requests within a time span may be indicative of an automated program performing these activities. (Collectively, block 506).

Returning back to FIGS. 1 and 4, once the user session is established, the user interface component 116 generates a display to obtain the user data needed to initiate the new user account. The user interface component 116 receives the email address and/or password from the input data. The new user account component 116 determines whether or not the email address or phone number associated with the request is already associated with an existing user account. If the email address or phone number is associated with an existing user account, an error message is displayed. (Collectively, block 402)

Otherwise, when the email address or phone number is not associated with an existing user account and before the new user account is opened, the new user account component 116 checks the reputation of the requestor by obtaining a risk level from the risk engine 112. The risk level is used to identify the complexity of the gamified challenge. (Collectively, block 404).

Turning to FIG. 5, the risk level is used to determine the complexity of the challenge and if the challenge is being tampered with. The risk engine 112 uses the tracked features and metrics to determine a risk level to associate with the requester. In one aspect, heuristics may be used to analyze these factors. For example, if the overall number of challenges from the website is higher than normal and these challenges are from a specific location or IP address, the risk engine would indicate a high-risk level. If the IP address associated with a request has been used previously in a malicious activity, the risk engine would indicate a high-risk level. If the requestor has made several requests within a time span and failed each challenge attempt, the risk engine would indicate a high-risk level. The risk engine would return a low risk level when the heuristics did not associate a high-risk level with the features and metrics.

Alternatively, the risk engine 112 may use heuristics to identify patterns from the features and metrics. For example, when a new user account request is generated at the same time-of-day from the same geographic location from the same IP address routinely, the risk engine would generate a high-risk level indicating a suspicion that the challenge is being tampered with or initiated from a non-human user.

Turning back to FIG. 4, the user account component 114 processes the request when the risk level is associated low (blocks 406—yes, 408). When the risk level is high (block 406—no), a first-level gamified challenge is used to determine if the request is from a non-human user (block 410).

The user interface component 116 initiates the gamified challenge component 118 to dynamically generate a first-level gamified challenge, such as the gamified challenge shown in FIG. 3A. If the user passes the first-level gamified challenge (block 412—yes), the user account component 114 proceeds with processing the request (block 408).

Otherwise (block 412—no), the gamified challenge component 118 proceeds with adding an extra level of complexity to the challenge (block 410) if the user has not exceeded a threshold number of attempts (block 414—no). The gamified challenge component 118 may add additional geometric objects to the challenge, place all the geometric objects in a different orientation and/or animation, and increase the length of the challenge sequence. For example, any one of the challenges shown in FIGS. 3E and 3F may be used. The user is given a certain amount of time in which to pass the challenge. If the user passes the challenge within the allotted time and within the allotted number of attempts (block 412—yes, 414—no), the user account component 114 proceeds with processing the new user account request (block 408).

If the user fails the challenge after the allotted number of attempts (block 414—yes), then the request is rejected (block 416). The user interface component 116 may notify the user as shown in the user display of FIG. 3G. In addition, the risk engine 112 tracks the rejection (block 416).

Exemplary Operating Environment

Figure 6:
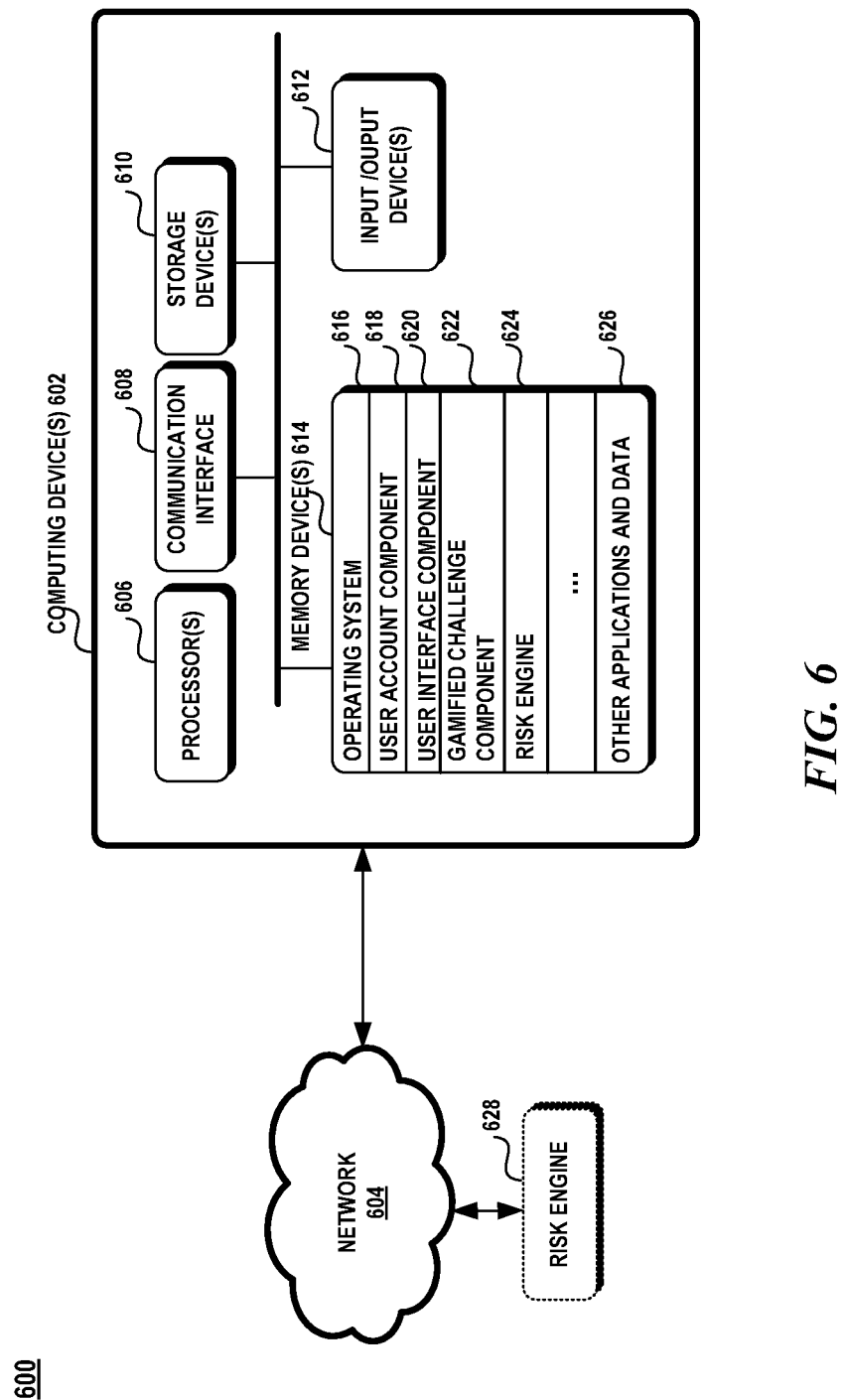
FIG. 6 is a block diagram illustrating an exemplary operating environment.

Attention now turns to a discussion of an exemplary operating environment. FIG. 6 illustrates an exemplary operating environment 600 in which one or more computing devices 602 are used to facilitate the gamified challenge. However, it should be noted that the aspects disclosed herein is not constrained to any particular configuration of devices. Computing devices 602 may be configured as a cloud service that perform the gamified challenge non-human user detection. It should be noted that the operating environment is not limited to any particular configuration and other configurations are possible.

A computing devices 602 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 400 may be configured in a network environment, a distributed environment, a multi-processor environment, or a stand-alone computing device having access to remote or local storage devices.

The computing device 602 may include one or more processors 606, one or more communication interfaces 608, one or more storage devices 610, one or more input/output devices 612, and one or more memory devices 614. A processor 606 may be any commercially available or customized processor and may include dual microprocessors and multi-processor architectures. The communication interface 608 facilitates wired or wireless communications between the computing device 602 and other devices. A storage device 610 may be computer-readable medium that does not contain propagating signals, such as modulated data signals transmitted through a carrier wave. Examples of a storage device 610 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 610 in the computing device 602. The input/output devices 612 may include a keyboard, mouse, pen, voice input device, touch input device, display, speakers, printers, etc., and any combination thereof.

A memory device 614 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 614 may also include one or more external storage devices or remotely located storage devices that do not pertain to propagated signals, such as modulated data signals transmitted through a carrier wave. The memory device 614 may include an operating system 616, a user account component 618, a user interface component 620, a gamified challenge component 622, a risk engine 624, and other applications and data 626.

A computing device 602 may be communicatively coupled to a network 604. The network 604 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 604 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

In one aspect, one or more of the computing devices 602 may be part of a cloud service. A cloud service is any service made available to users on demand from the Internet from a cloud service provider, other than the user's on-premise servers. Cloud services include online data storage and backup solutions, web-based email services, hosted office suites, document collaboration services, database processing services, technical support services, etc. Examples of cloud services include Microsoft Azure, Google Cloud, Amazon Web Services, and the like.

In one aspect, the risk engine 628 may be located outside of the website or the cloud service. In this aspect, the risk engine 628 may utilize additional features and metrics to detect a non-human user. The risk engine 628 may utilize information from malware services that track the IP addresses of malicious activities. The risk engine 628 may analyze the network traffic into the website and/or cloud service to detect patterns of suspicious activity.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A system is disclosed having one or more processors and a memory. The memory contains at least one program configured to be executed by the one or more processors. The at least one program including instructions that: during a user session for a new user account, track features from the request; generate a risk level based on the tracked features; based on a high risk level, initiate a gamified challenge before processing the request, the gamified challenge including a dynamically-generated sequence of geometric objects, a geometric object in the sequence having an orientation, color, and animation effect, the gamified challenge having instructions for a user to interact with one or more of the geometric objects in a particular order within a span of time; and upon a number of failed attempts at the gamified challenge, reject the request as being initiated from a non-human user.

In one aspect of the system, the tracked features include one or more of an IP address, a location associated with the IP address, a time-of-day, a browser used to initiate the request, or a browser extension used by the browser.

In another aspect of the system, the at least one program includes further instructions that upon a failed attempt at the gamified challenge, increase a complexity of the gamified challenge. The increased complexity is made by increasing a number of geometric objects in the sequence, by associating one or more geometric objects in the sequence with a different orientation, by associating one or more geometric object in the sequence with a different animation effect, or by adding different types of geometric objects into the sequence.

A method is disclosed comprising: tracking features extracted from a user's request at a computing device offering a resource; analyzing the tracked features to determine a risk level of the request being associated with a non-human user; based on the analysis indicating a high risk level, generating a gamified challenge, the gamified challenge including a sequence of geometrically-shaped objects, a geometrically-shaped object in the sequence having an orientation, color, and an animation effect, the gamified challenge having instructions for a user to interact with one or more of the geometrically-shaped objects in a particular order within a span of time; and based on the analysis indicating a low risk level, processing the user's request without generating the gamified challenge.

The method further comprises, upon detection of a failed attempt at the gamified challenge, increasing the complexity of the gamified challenge. Increasing the complexity of the gamified challenge further comprises, increasing a number of geometrically-shaped objects in the sequence, adding a different type of geometrically-shaped object to the sequence, associating one or more geometrically-shaped objects in the sequence with a different animation effect, or associating one or more geometrically-shaped objects in the sequence in a different orientation. The method further comprises, when a number of failed attempts at the gamified challenge exceeds a threshold, reject the request.

In one aspect, the tracked features include one or more of an IP address, a location associated with the IP address, a time-of-day, a browser used to initiate the request, or a browser extension used by the browser. In another aspect, the tracked features include usage metrics of the computing device. The method further comprises rejecting the request, when the challenge is not completed within a particular time limit.

A device is disclosed having a memory coupled to a processor. The processor is configured to: receive a request to establish a user session with the device; track features extracted from the established user session; based on the tracked features, generate a first gamified challenge to determine if a non-human user is communicating in the user session, the first gamified challenge including a first sequence of geometrically-shaped objects, a geometrically-shaped object in the first sequence having an orientation, color, and an animated effect, the first gamified challenge having a first set of instructions for a user to interact with one or more of the geometrically-shaped objects in a particular order and within a time limit; upon failure of the first gamified challenge, generate a second gamified challenge with a different sequence than the first sequence, the different sequence having additional geometrically-shaped objects and a second set of instructions that differ from the first set of instructions; and upon a subsequent failure of the second gamified challenge, terminate the request.

In an aspect, the tracked features include one or more of an IP address, a location associated with the IP address, a time-of-day, a browser used to initiate the request, or a browser extension used by the browser.

In an aspect, the second gamified challenge uses a different animated effect for each of the geometrically-shaped objects than in the first gamified challenge. In an aspect, the second gamified challenge uses a different orientation to display each of the geometrically-shaped objects than in the first gamified challenge.

In an aspect, the processor is further configured to use the extracted features to determine a risk level associated with the user of the request, the risk level being high when the extracted features indicate a past history of malicious activity.

In an aspect, the processor is further configured to use the extracted features to determine a risk level associated with the user of the request, the risk level being high when the extracted features indicate a pattern of repeated failed attempts from a common IP address.

What is claimed:

1. A system comprising:
   one or more processors; and a memory;
   at least one program, wherein the at least one program is stored in the memory and configured to be executed by the one or more processors, the at least one program including instructions to perform actions that:
   receive a request to establish a user session for a new user account;
   track features from the request;
   generate a risk level based on the tracked features;
   based on a high-risk level, initiate a gamified challenge before processing the request, the gamified challenge including a dynamically-generated sequence of geometric objects displayed in a first order, each geometric object in the sequence having a geometric shape with an orientation, color, and animation effect, the gamified challenge having instructions for a user to choose select ones of the geometric objects in a second order in which the select ones of the geometric objects are animated, wherein the second order differs from the first order;
   detect interactions with one or more of the geometric objects within a span of time;
   when the detected interactions differ from the second order, indicate a failed attempt; and
   upon detection of a number of failed attempts at the gamified challenge, reject the request as being initiated from a non-human user.

2. The system of claim 1, wherein the tracked features include one or more of an IP address, a location associated with the IP address, a time-of-day, a browser used to initiate the request, or a browser extension used by the browser.

3. The system of claim 1, wherein the select ones of the geometric objects include a common color and/or common shape.

4. The system of claim 1, wherein the at least one program includes further instructions to perform actions that:
   upon a failed attempt at the gamified challenge, increase the complexity of the gamified challenge by increasing a number of geometric objects in the sequence.

5. The system of claim 1, wherein the at least one program includes further instructions to perform actions that:
   upon a failed attempt at the gamified challenge, increase the complexity of the gamified challenge by associating one or more geometric objects in the sequence with a different orientation.

6. The system of claim 1, wherein the at least one program includes further instructions to perform actions that:
   upon detection of a low-risk level, processing the request without generating the gamified challenge.

7. The system of claim 1, wherein the at least one program includes further instructions to perform actions that:
   upon a failed attempt at the gamified challenge, increase the complexity of the gamified challenge by adding different types of geometric objects into the sequence.

8. A method, comprising:
   tracking features extracted from a user's request at a computing device offering a resource;
   analyzing the tracked features to determine a risk level of the request being associated with a non-human user;
   based on the analysis indicating a high-risk level of the request being from a non-human user, generating a gamified challenge, the gamified challenge including a sequence of geometrically-shaped objects displayed in a first order, a geometrically-shaped object in the sequence having an orientation, color, and an animation effect, the gamified challenge having instructions for a user to repeat a second order in which the geometrically-shaped objects of the sequence are animated within a span of time, wherein the first order and the second order differ; and
   based on the analysis indicating a low-risk level of the request being from a non-human user, processing the user's request without generating the gamified challenge.

9. The method of claim 8, further comprising:
   upon detection of a failed attempt at the gamified challenge, increasing the complexity of the gamified challenge.

10. The method of claim 9, wherein increasing the complexity of the gamified challenge further comprises:

increasing a number of geometrically-shaped objects in the sequence, adding a different type of geometrically-shaped object to the sequence, associating one or more geometrically-shaped objects in the sequence with a different animation effect, or associating one or more geometrically-shaped objects in the sequence in a different orientation.

11. The method of claim 8, further comprising:
when a number of failed attempts at the gamified challenge exceeds a threshold, reject the request.

12. The method of claim 8, wherein the tracked features include one or more of an IP address, a location associated with the IP address, a time-of-day, a browser used to initiate the request, or a browser extension used by the browser.

13. The method of claim 8, wherein the tracked features include usage metrics of the computing device.

14. The method of claim 8, further comprising:
rejecting the request, when the challenge is not completed within the span of time.

15. A device, comprising:
a memory coupled to a processor;
wherein the processor is configured to perform actions that:
receive a request to establish a user session with the device;
track features extracted from the established user session;
based on the tracked features, generate a first gamified challenge to determine if a non-human user is communicating in the established user session, the first gamified challenge including a first sequence of geometrically-shaped objects, each geometrically-shaped object in the first sequence having an orientation, color, and an animated effect, the first gamified challenge having a first set of instructions for a user to interact with a first subset of the geometrically-shaped objects in an order in which the first subset of the geometrically-shaped objects are animated;
upon failure of the first gamified challenge, generate a second gamified challenge with a different sequence than the first sequence, the different sequence having additional geometrically-shaped objects and a second set of instructions for a user to interact with a second subset of the geometrically-shaped objects in an order in which the second subset of the geometrically-shaped objects are animated; and
upon a subsequent failure of the second gamified challenge, terminate the request.

16. The device of claim 15, wherein the tracked features include one or more of an IP address, a location associated with the IP address, a time-of-day, a browser used to initiate the request, or a browser extension used by the browser.

17. The device of claim 15, wherein the second gamified challenge uses a different animated effect for each of the geometrically-shaped objects in the second subset of the geometrically-shaped objects, wherein the first subset differs from the second subset.

18. The device of claim 15, wherein the second gamified challenge uses a different orientation to display each of the geometrically-shaped objects than in the first gamified challenge.

19. The device of claim 15, wherein the processor is further configured to perform actions that:
use the extracted features to determine a risk level associated with the user of the request, the risk level being high when the extracted features indicate a past history of malicious activity.

20. The device of claim 15, wherein the processor is further configured to perform actions that:
use the extracted features to determine a risk level associated with the user of the request, the risk level being high when the extracted features indicate a pattern of repeated failed attempts from a common IP address.

* * * * *